United States Patent
Ushikoshi et al.

(10) Patent No.: US 7,637,979 B2
(45) Date of Patent: Dec. 29, 2009

(54) FABRICATION METHOD OF DIESEL PARTICULAR FILTER ELEMENT

(75) Inventors: Juntaro Ushikoshi, Ichihara (JP); Shoichi Ibaragi, Tamano (JP); Kanehisa Imai, Tokyo (JP); Tomohiko Okutani, Himeji (JP)

(73) Assignees: Mitsui Engineering & Shipbuilding Co., Ltd., Tokyo (JP); Okutani Wire Netting, Mfg, Co., Ltd, Kobe (JP)

( * ) Notice: Subject to any disclaimer, the term of this patent is extended or adjusted under 35 U.S.C. 154(b) by 171 days.

(21) Appl. No.: 11/790,696

(22) Filed: Apr. 26, 2007

(65) Prior Publication Data

US 2008/0264023 A1    Oct. 30, 2008

(51) Int. Cl.
   *B01D 39/00* (2006.01)
   *B01D 39/06* (2006.01)
   *B01D 39/14* (2006.01)
   *B01D 39/08* (2006.01)

(52) U.S. Cl. .............................. 55/525; 55/522; 55/523; 55/524

(58) Field of Classification Search ............ 55/522–525
   See application file for complete search history.

(56) References Cited

U.S. PATENT DOCUMENTS

| | | | | | |
|---|---|---|---|---|---|
| 2,334,263 | A | * | 11/1943 | Hartwell | 210/494.2 |
| 2,819,800 | A | * | 1/1958 | Goodloe | 210/497.1 |
| 3,332,557 | A | * | 7/1967 | Pall | 210/495 |
| 3,659,402 | A | * | 5/1972 | Alliger | 96/297 |
| 3,780,872 | A | * | 12/1973 | Pall | 210/493.1 |
| 5,217,515 | A | * | 6/1993 | Guglielmi | 55/526 |
| 5,373,615 | A | * | 12/1994 | Webb et al. | 29/896.62 |
| 5,837,018 | A | * | 11/1998 | Goerg | 55/385.3 |
| 6,491,320 | B1 | * | 12/2002 | Nakashima et al. | 280/736 |
| 7,458,154 | B2 | * | 12/2008 | Marino, Jr. | 29/890.08 |
| 2004/0055262 | A1 | * | 3/2004 | Zettel | 55/282.3 |

FOREIGN PATENT DOCUMENTS

JP    2002-336627 A    11/2002

* cited by examiner

Primary Examiner—Walter D Griffin
Assistant Examiner—Amber Orlando
(74) Attorney, Agent, or Firm—Kubovcik & Kubovcik

(57) ABSTRACT

A diesel engine exhaust gas filter [8] is manufactured by winding a belt-like wire mesh [1] knitted from a metal wire [2] into a swirl body while being extended in the longitudinal direction and compressing it in the widthwise direction in a molding die. [6].

7 Claims, 10 Drawing Sheets

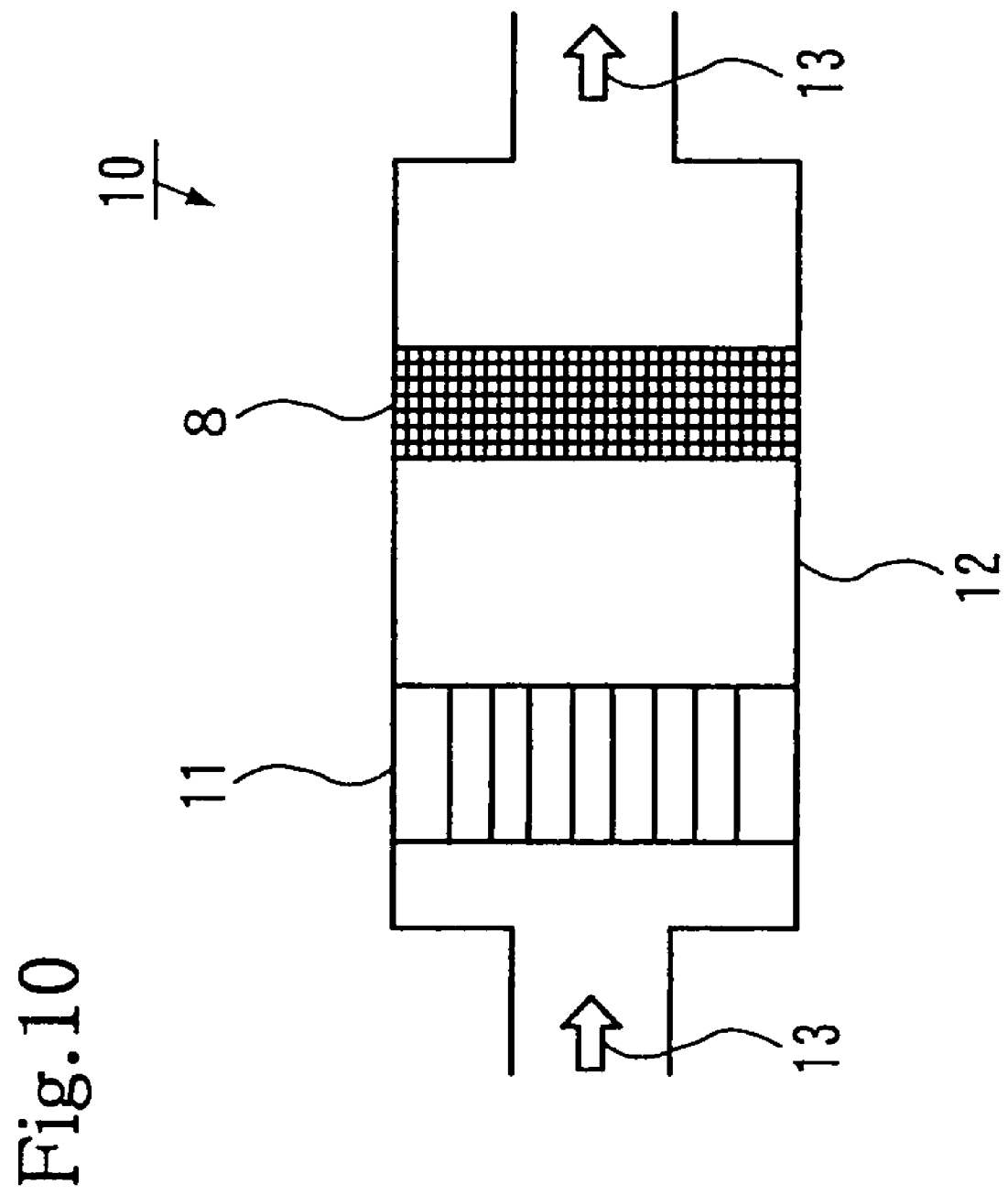

FABRICATION METHOD OF DIESEL PARTICULAR FILTER ELEMENT

BACKGROUND OF THE INVENTION

This invention pertains to a filter for purifying the exhaust gas from a diesel engine and in particular pertains to a filter that removes particulate matter contained in the exhaust gas.

DESCRIPTION OF RELATED ART

In recent years atmospheric pollution from particulate matter contained in the exhaust gases released in large amounts from diesel engines in such large-scale vehicles as busses and trucks has become a serious problem.

This particulate matter with minute carbon particles (soot) and unburned fuel as the principal components has a deleterious effect on health and restricting the amount of discharge into the environment has become a critical problem.

As a result, technology has been developed for decreasing the amount of particulate matter released by putting a filter in diesel engines for collecting and removing the particulate matter.

As an example of this filter Toyota et. al. have proposed a filter made of wire mesh that causes the particulate matter to adhere and be collected [Japanese patent application Kokai publication No. 2002-336627].

This filter is generally made by winding a belt-like wire mesh into a swirl body but this has the problem called telescoping in which the center part of the filter protrudes on the downstream side because of the pressure of the exhaust gases.

In order to resolve this problem, Steven has proposed a filter in which a wire mesh is wound in a spiral shape after it has been folded into two along the longitudinal direction [U.S. Pat. No. 7,025,797].

However, in the above-described invention, the wire mesh layers that are adjacent each other are lower in strength because they are only in contact and the problem of telescoping cannot be completely prevented.

Furthermore, because it is difficult to control the density of the filter uniformly with good precision, there is also the problem that the particulate matter cannot be effectively collected.

SUMMARY OF THE INVENTION

This invention takes the above-described problems into consideration and its objective is to provide a manufacturing method for a filter in which, in addition to being able to prevent telescoping more than has been possible up to now, its density is uniformly controlled with good precision.

Consequently, this invention is a manufacturing method for a filter used in the exhaust gases of a diesel engine in which, while a belt-like wire mesh is stretched in the longitudinal direction, this wound wire mesh is wound in a spiral shape and in its molding die is compressed in the widthwise direction.

According to this manufacturing method, because the wire mesh can be wound into a uniform configuration while maintaining its shape and the adjacent wire mesh layers are intertwined with each other increasing the strength, it is possible to prevent telescoping more than in the past. Furthermore, by changing the degree of compression, it is possible to control the apparent density of the filter uniformly with good precision over the entire filter and to effectively collect particulate matter.

Additionally, when using a filter manufactured in this manner in a large diesel engine in which the exhaust gas temperature is 250 to 450° C. and the concentration of the particulate matter is 1 mg/m$^3$ or higher, it is preferred that the apparent density be in the 1 to 3 g/cm$^3$ range.

Furthermore, this apparent density refers to the value of the weight of the filter (g) divided by its outside direction [cm$^3$].

BRIEF DESCRIPTION OF THE DRAWINGS

FIG. 10 is a cross-sectional diagram of the exhaust emission control device using the exhaust gas filter of this invention.

DETAILED DESCRIPTION OF THE INVENTION

Figure 1:
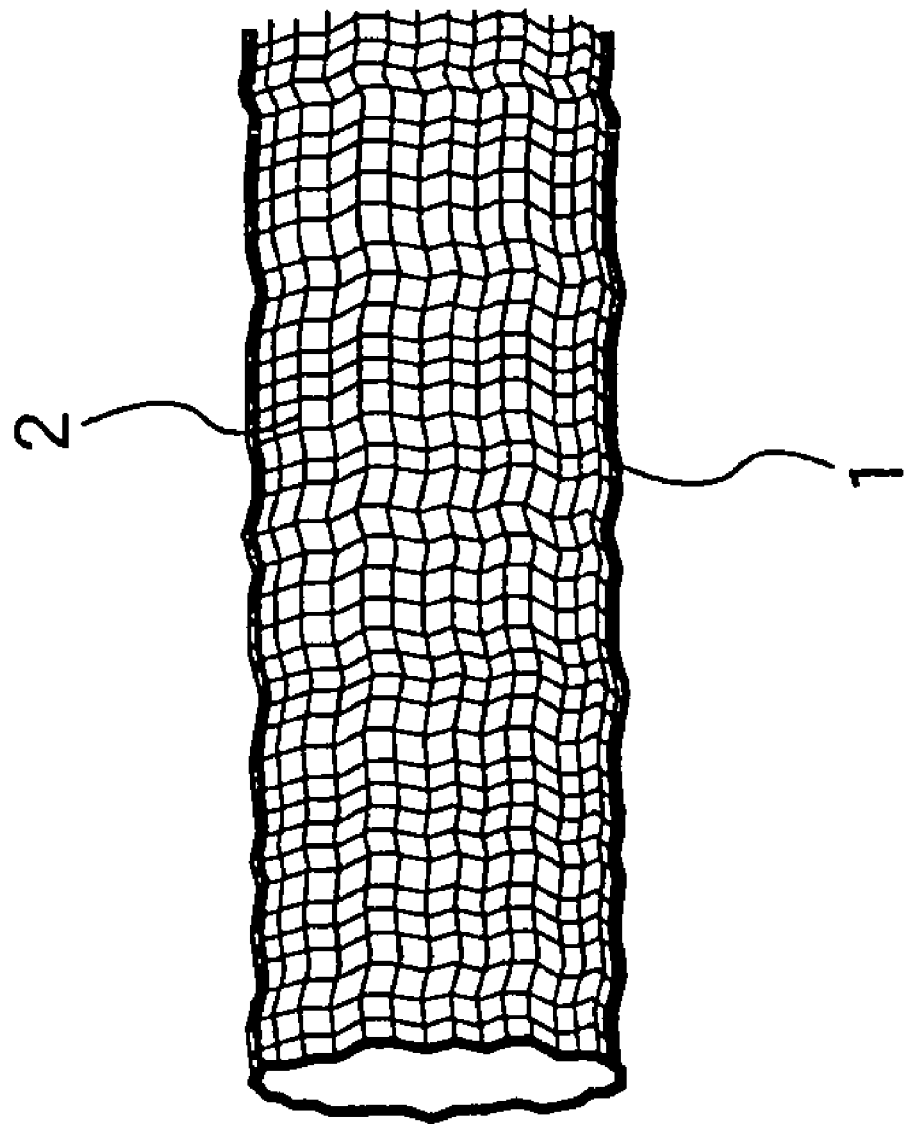
FIG. 1 is a three-directional surface showing the structure of the wire mesh.

As shown in FIG. 1, a belt-like wire mesh [1] is used in the manufacturing method for the exhaust gas filter pertaining to this invention. This wire mesh [1] is made by knitting an extra fine metal wire [2] into a tube shape. Stainless steel is used as the material for this wire [2] because of its outstanding heat resistance and anti-corrosion properties with a desired thickness range of 0.1 to 0.5 mm. Furthermore, in order to use already existing equipment and to keep manufacturing costs down, it is preferred if spacing of a mesh of the wire mesh is in the 1 to 4 mm range. The belt-like wire mesh [1] may also be a wire mesh in which metal wires are knitted into a sack-like form or are stockinette-stitched and waved in a sack-like form.

An explanation of the manufacturing method for the exhaust gas filter used in this invention is given below.

Figure 2:
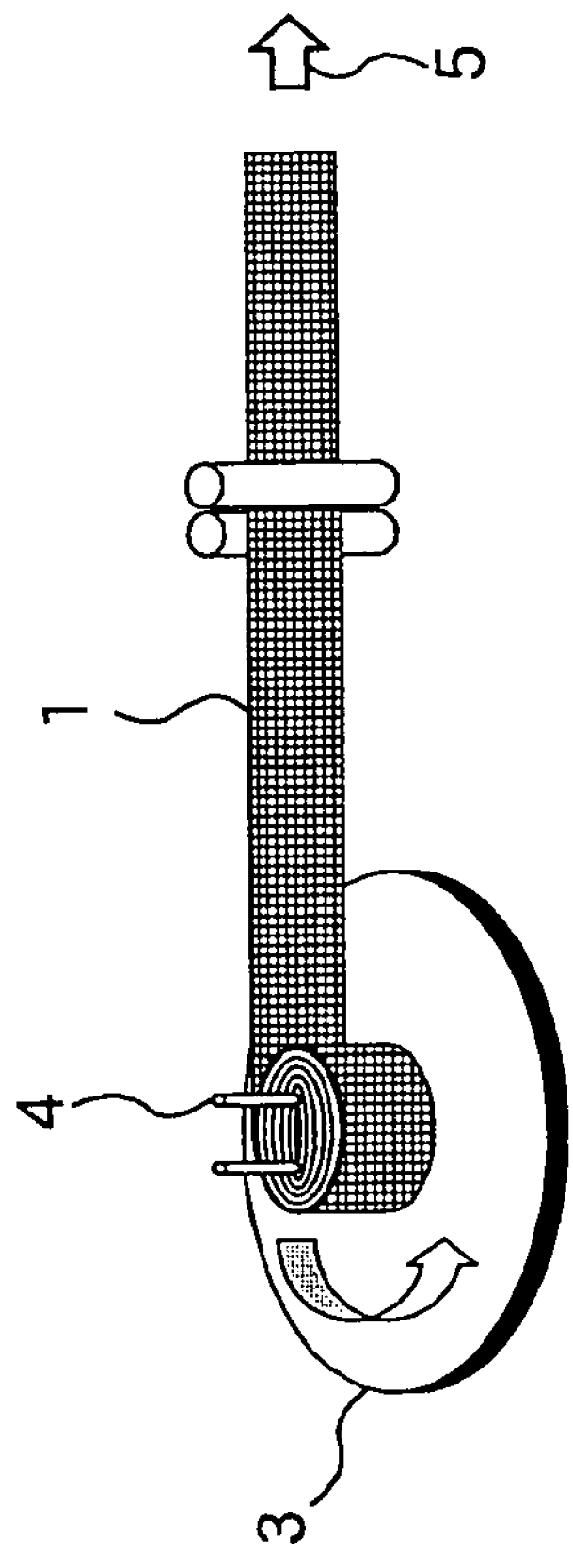
FIG. 2 is a perspective view illustrating the manufacturing method for the exhaust gas filter of this invention.

First, as shown in FIG. 2 one end of the wire mesh [1] is fixed to a fixed shaft [4] on a table [3] and the wire mesh [1] is wound into a swirl body by causing the table [3] to rotate. By winding the mesh while adding a tensile stress [5] with a prescribed magnitude in the longitudinal direction of the wire mesh [1] at this time, it is possible to roll the wire mesh [1] uniformly while maintaining its shape. The magnitude of this tensile stress [5] should be in the range of $1 \times 10^6$ to $5 \times 10^6$ N/m$^2$, preferably $1 \times 10^6$ to $4 \times 10^6$ N/m$^2$ and even more preferably $2 \times 10^6$ to $3 \times 10^6$ N/m$^2$.

Figure 3:
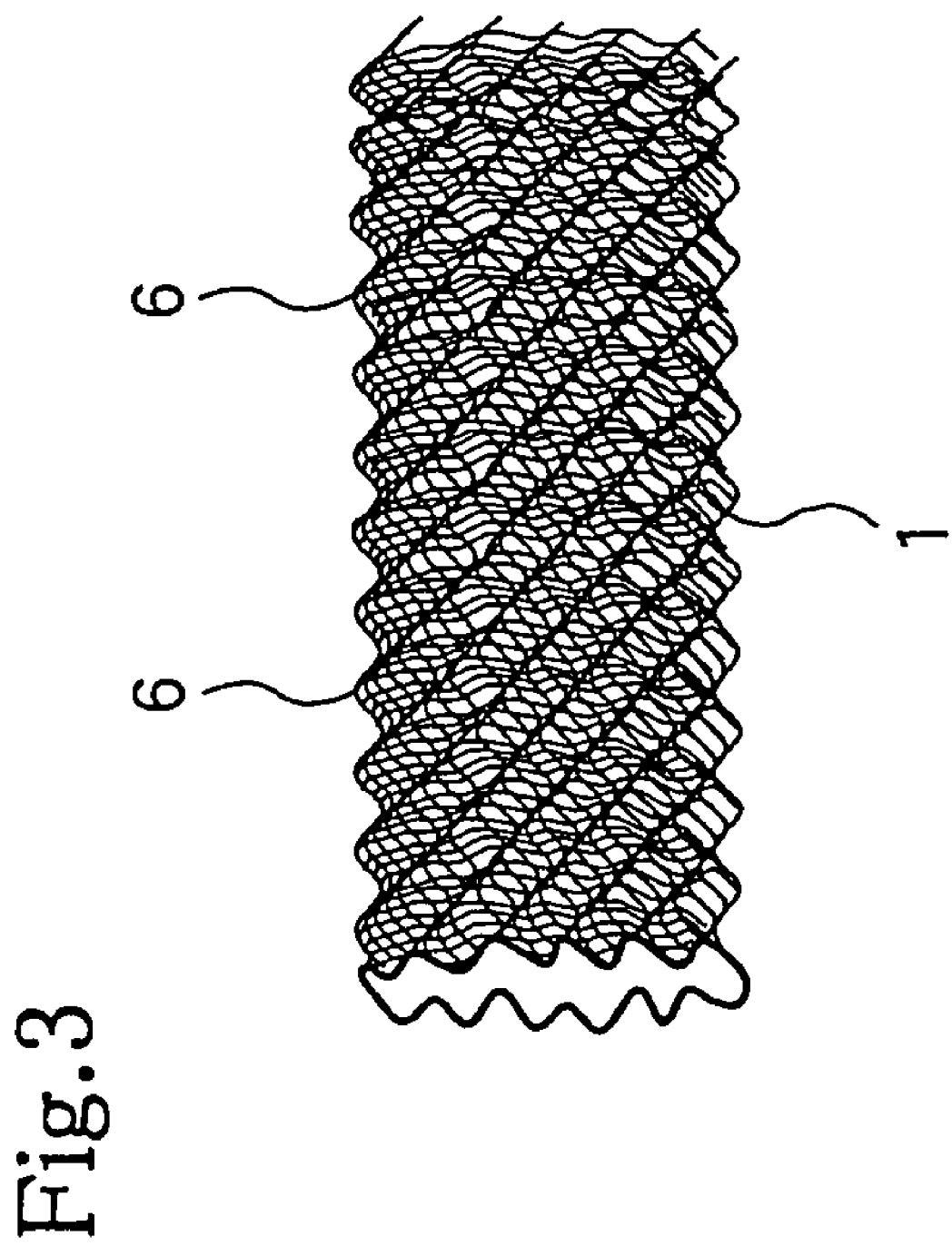
FIG. 3 is a perspective view of the first embodiment of the manufacturing method for the exhaust gas filter of this invention.
Figure 4:
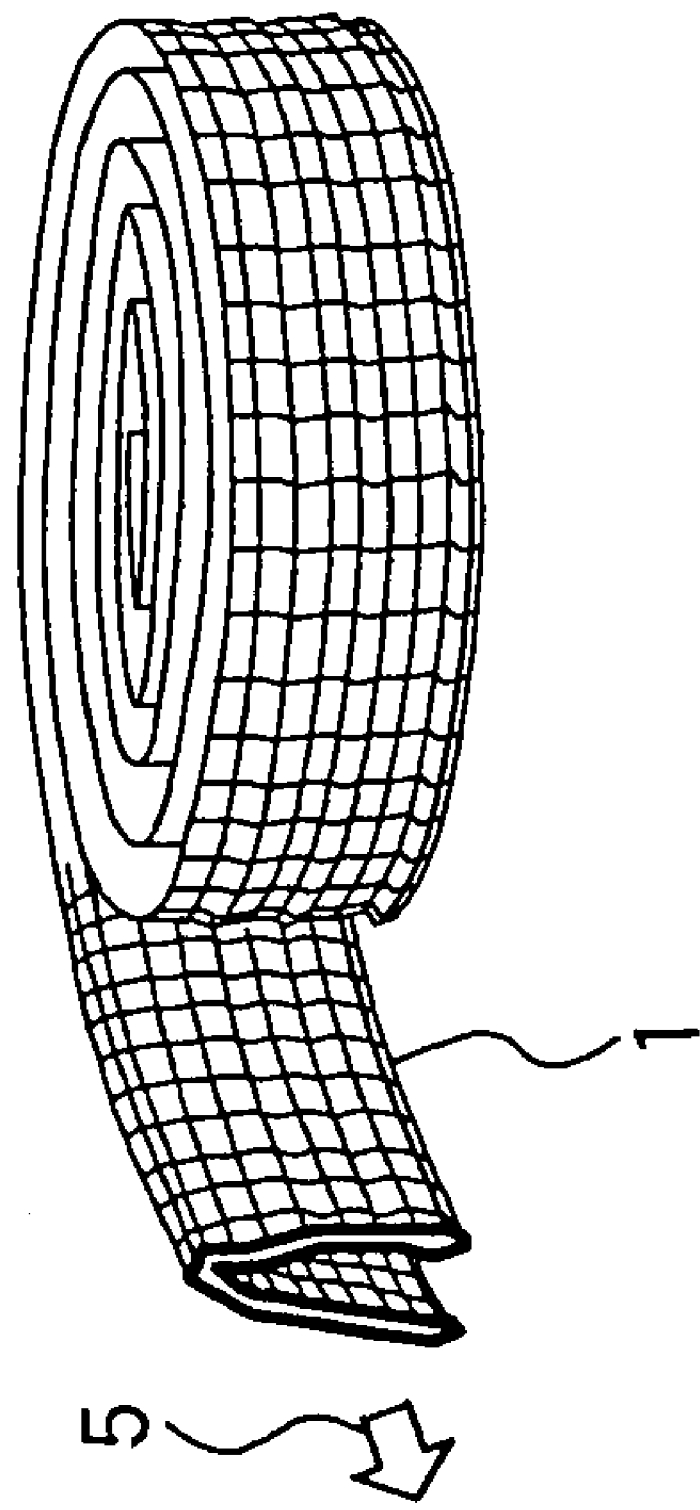
FIG. 4 is a perspective view of the second embodiment of the manufacturing method for the exhaust gas filter of this invention.
Figure 5:
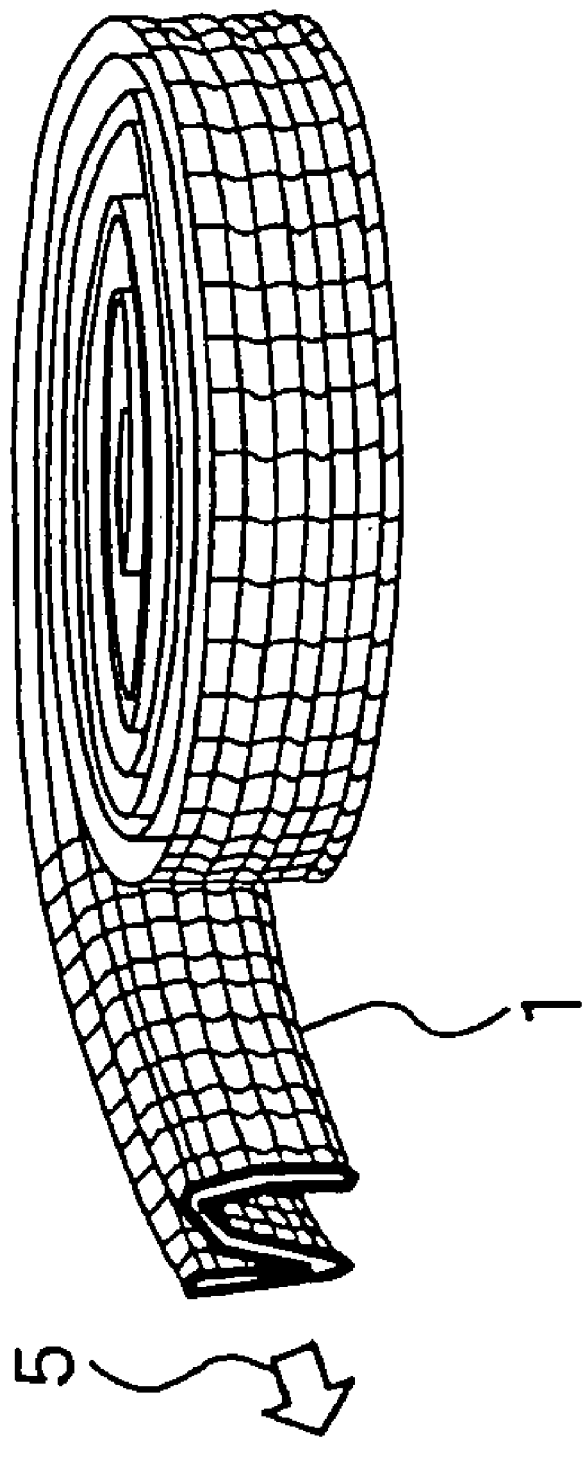
FIG. 5 is a perspective view of the third embodiment of the manufacturing method for the exhaust gas filter of this invention.
Figure 6:
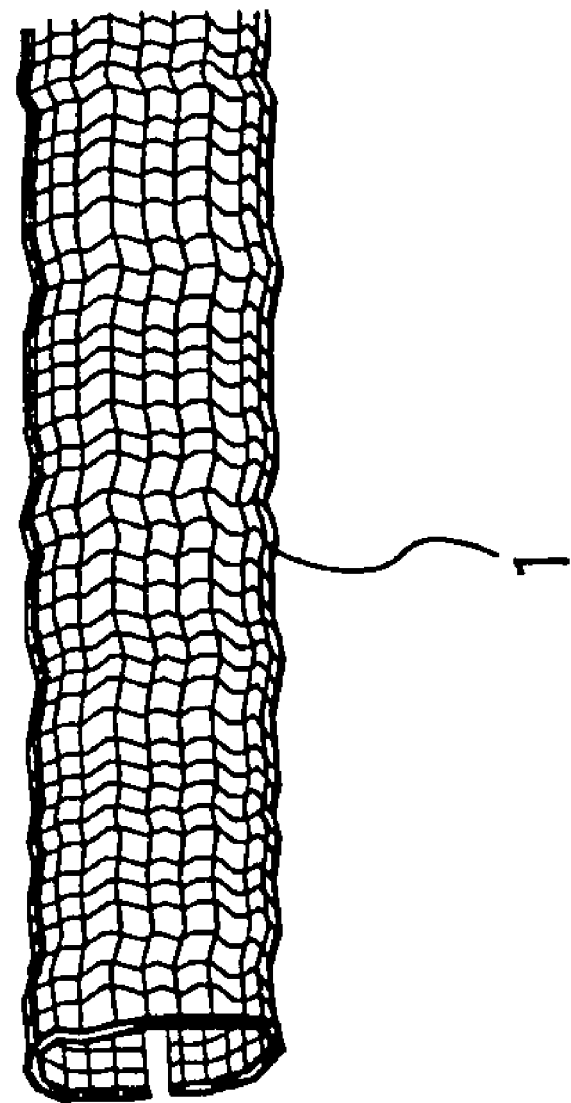
FIG. 6 is an enlarged view of a part of the fourth embodiment of the manufacturing method for the exhaust gas filter of this invention.
Figure 7:
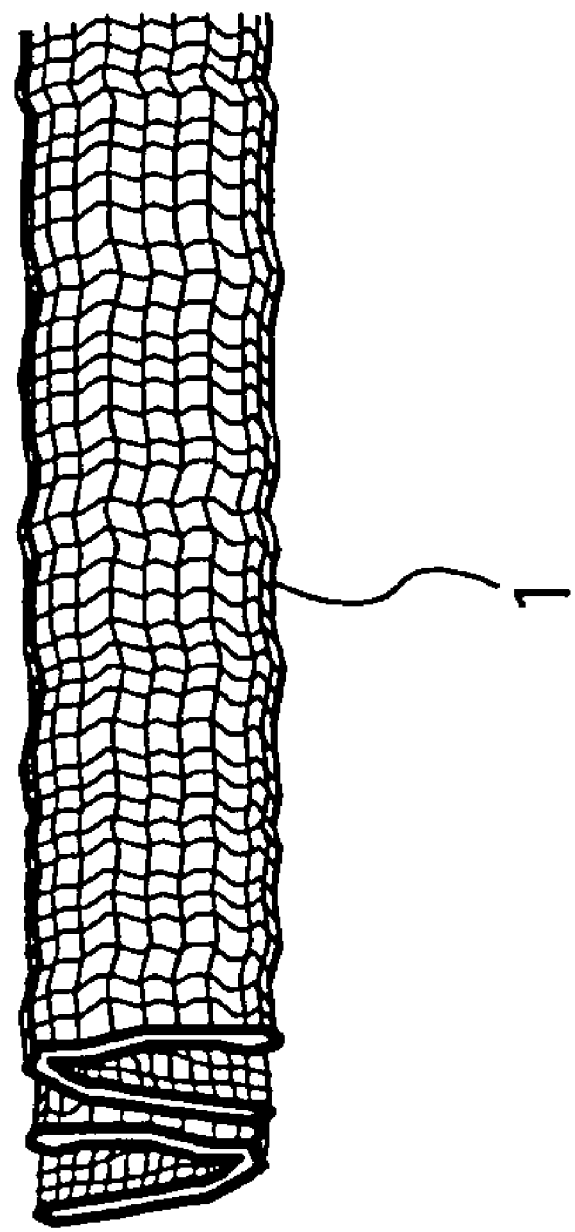
FIG. 7 is an enlarged view of a part of the fifth embodiment of the manufacturing method for the exhaust gas filter of this invention.

As shown in FIG. 3, by knitting and making waves [6] beforehand, it is possible to prevent misalignment in the wire mesh [1]. Additionally, as shown in FIGS. 4 and 5, by winding the wire mesh [1] in the longitudinal direction after being folded into two or three, it is possible to reduce the number of wrappings and streamline the manufacturing process. At this time, in order to maintain the shape from the superimposition of the folded parts that are in contact as, for example, when folded in half, the cross section may be in the form of the letter C [FIG. 6] or the two reciprocally folded parts may be folded so that they are alternately reversed [FIG. 7].

Figure 8:
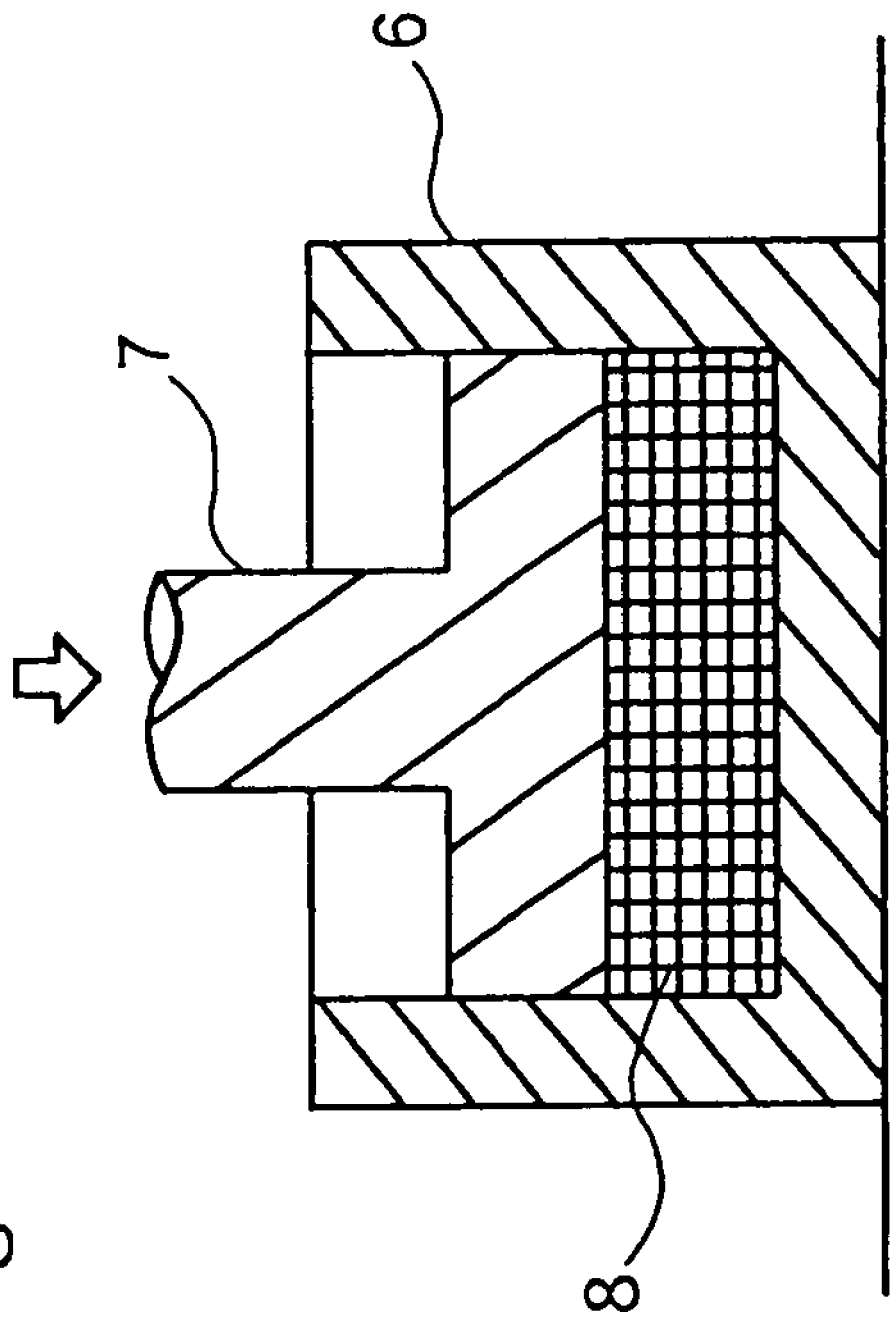
FIG. 8 is an explanatory diagram showing how the wound wire mesh is compressed and molded and the filter made.
Figure 9A:
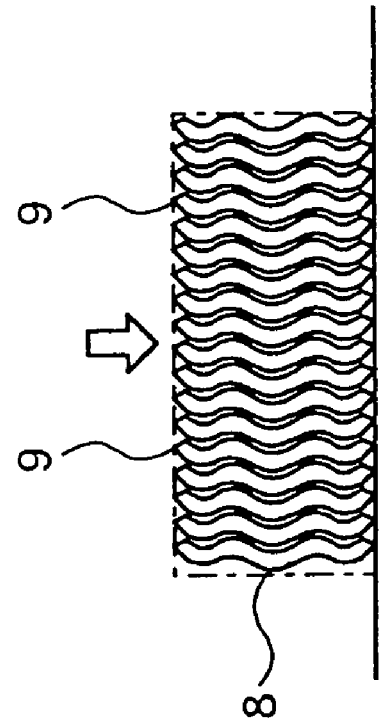
FIG. 9A is a conceptual diagram before the cross-section of the filter at compression and molding time has been changed.
Figure 9B:
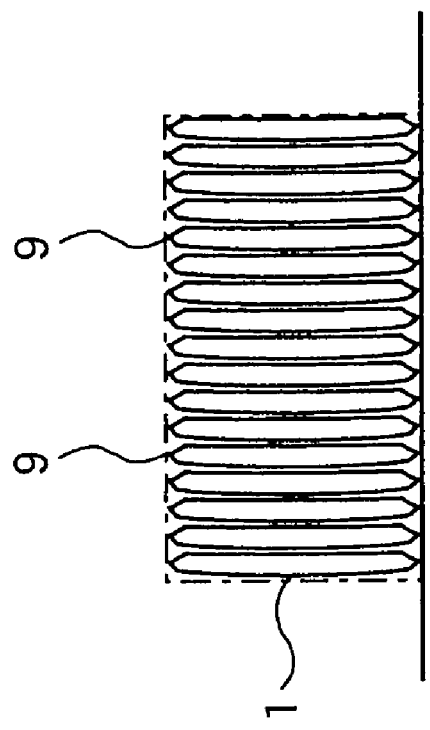
FIG. 9B is a conceptual diagram after the cross-section of the filter at compression and molding time has been changed.

Next, as shown in FIG. 8, the wire mesh [1] which has been wound up to a prescribed outside diameter is positioned in the molding die [6] with the upper surface open and the filter [8] is made by press forming from above with the piston [7] that is in contact with a machine press. At this time, as shown in FIGS. 9A and 9B the wire mesh [1] is pressed into an accordion shape completely from top to bottom and the layers [9] of the adjacent wire mesh are transformed so as to be mutually intertwined. Because movement of the filter [8] in the tangential direction is restricted, the wire mesh [1] is compressed uniformly. Based on this principle, it is possible to adjust the density of the filter [8] and to have uniform precision. Additionally, because the adjacent layers [9] of the wire mesh are intertwined and their strength is increased, it is possible to prevent telescoping of the filter from the exhaust gas more than in the past.

Furthermore, from the perspective of facilitating the manufacturing process, the compression rate at this time may reduce the height of the wound wire mesh [1] by 10 to 90%, preferably 30 to 50% and the compression rate after final molding may be 10 to 50%.

An example of exhaust gas purification device in a diesel engine using a filter manufactured in the above-described manufacturing method is shown in FIG. 10.

This exhaust gas purification device [10] comprises a harmful gas purification device [11] with a catalyst such as platinum and a filter [8] placed successively from the upstream side inside the pipe casing [12] making desorption possible. The exhaust gas [13] flowing into the exhaust gas purification device [10] from the diesel engine which is not shown in the diagram in addition to oxidizing and eliminating carbon monoxide [CO] and hydrocarbons [HC], also oxidizes nitrogen monoxide [NO] which is one of the nitrogen oxides to nitrogen dioxide [$NO_2$]. The particulate matter in the exhaust gas [13] is collected by colliding with and adhering to the filter [8] and is oxidized by the nitrogen dioxide [$NO_2$] produced upstream and combusted. Because of the high strength between the adjacent layers [9] of the wire mesh at this time, it is possible to prevent telescoping from the exhaust gas pressure. Furthermore, because the apparent density is uniform, it is possible to effectively collect the particulate matter over the entire filter [8] without causing any major increase in pressure loss.

Additionally, when the diesel engine is a large one in which the exhaust gas temperature is 250 to 450° C. and the concentration of the particulate matter is 1 mg/$m^3$ or higher, it is preferable if the apparent density of the filter is 1 to 3 g/$cm^3$. This is because when the apparent density of the filter is less than 1 g/$cm^3$, the collection rate goes down and when it exceeds 3 g/$cm^3$, the differential pressure increases.

Embodiment 6 wires made of type 304 stainless steel with a diameter of 0.12 mm were plain knitted and with the specifications shown in FIG. 1 a belt-like wire mesh with a width of 60 mm was manufactured. This wire mesh was halved and with the method shown in FIG. 2 wound into a swirl body while applying tensile stress until the outside diameter was 360 mm. The tensile stress as shown in Table 1 was changed in accordance with the size of the outside diameter of the filter.

TABLE 1

| Filter outside diameter (mm) | Tensile stress (N/$m^2$) |
|---|---|
| 100 and below | $2.31 \times 10^6$ |
| 100-200 | $2.41 \times 10^6$ |
| 200-300 | $2.39 \times 10^6$ |
| 300-350 | $2.78 \times 10^6$ |

As shown in FIG. 8, the wire mesh wound in this manner was compressed with the addition of a 40 t pressure from above inside the molding die until the wire mesh height reached 60% and a filter was made with an apparent density of 1.35 g/$cm^3$.

This filter was affixed to the exhaust gas purification device as shown in FIG. 10 and a purification test of the exhaust gas from a diesel engine with an output of 300 kW was conducted.

As a result, it was verified that when the operating load was 25%, the amount of particulate matter released into the atmosphere was reduced from 0.49 g/(hp hr) to 0.25 g/(hp hr) and an extremely high particulate matter removal rate of approximately 49% was obtained.

What is claimed is:

1. A manufacturing method for an exhaust gas filter, wherein a wound wire mesh comprising two belt-like wire meshes, in each of which metal wires are knitted into a sack-like form and folded in half, arranged with reciprocally folded parts alternately reversed, is wound into a swirl body while a tensile stress is being applied in the longitudinal direction and the wound wire mesh is compressed in the widthwise direction thereof in a molding die.

2. The exhaust gas filter manufacturing method according to claim 1, wherein the tensile stress is $1 \times 10^6$ to $5 \times 10^6$ N/$m^2$.

3. The exhaust gas filter manufacturing method according to claim 1, wherein the compression rate in the widthwise direction is a decrease of 30 to 50% when the wound wire mesh is compressed in the widthwise direction in the molding die.

4. The exhaust gas filter manufacturing method according to claim 1, wherein the metal wire of the belt-like wire meshes is stockinette-stitched and waved in a sack-like form.

5. An exhaust gas filter comprising a wound wire mesh comprising two belt-like wire meshes, in each of which metal wires are knitted into a sack-like form and folded in half, arranged with reciprocally folded parts alternately reversed and wound in a swirl body while a tensile stress is being applied with a magnitude of $1 \times 10^6$ to $5 \times 10^6$ N/$m^2$ in the longitudinal direction, the wound wire mesh being compressed so that the compression rate in the widthwise direction of the wire mesh is a decrease of 30 to 50%.

6. The exhaust gas filter according to claim 5 in which the apparent density is 1 to 3 g/$cm^3$.

7. An exhaust gas purification device comprising the exhaust gas filter according to claim 5.

* * * * *